(12) United States Patent
Schwartz et al.

(10) Patent No.: US 10,909,858 B2
(45) Date of Patent: Feb. 2, 2021

(54) AIRCRAFT FLIGHT MANAGEMENT SYSTEMS AND METHODS

(71) Applicant: THE BOEING COMPANY, Chicago, IL (US)

(72) Inventors: Samantha Schwartz, Castle Pines, CO (US); Melissa Irene Blackstun, Darmstadt (DE); Theresa Ernsbach, Neu-Isenburg (DE); Brian Azcuenaga, Centennial, CO (US); Stephen Solomon Altus, Campbell, CA (US); Aaron Pilcher, Denver, CO (US); Jeffrey Lee Williams, Englewood, CO (US)

(73) Assignee: THE BOEING COMPANY, Chicago, IL (US)

( * ) Notice: Subject to any disclaimer, the term of this patent is extended or adjusted under 35 U.S.C. 154(b) by 194 days.

(21) Appl. No.: 16/145,705

(22) Filed: Sep. 28, 2018

(65) Prior Publication Data

US 2020/0105146 A1    Apr. 2, 2020

(51) Int. Cl.
*G08G 5/00* (2006.01)
*B64D 45/00* (2006.01)

(52) U.S. Cl.
CPC ......... *G08G 5/0021* (2013.01); *G08G 5/0034* (2013.01); *G08G 5/0039* (2013.01); *G08G 5/0047* (2013.01); *G08G 5/0078* (2013.01); *B64D 45/00* (2013.01)

(58) Field of Classification Search
CPC .. G08G 5/0021; G08G 5/0034; G08G 5/0039; G08G 5/0047; G08G 5/0078; B64D 45/00
USPC ....................................................... 701/122
See application file for complete search history.

(56) References Cited

U.S. PATENT DOCUMENTS

| 6,522,958 | B1  |   | 2/2003  | Dwyer    |            |
|-----------|-----|---|---------|----------|------------|
| 9,666,084 | B2  | * | 5/2017  | Shapiro  | G08G 5/0047 |
| 9,824,593 | B1  | * | 11/2017 | Kronfeld | G08G 5/0043 |
| 2016/0180718 | A1 |   | 6/2016 | Shapiro |            |
| 2016/0229554 | A1 | * | 8/2016 | Kawalkar | G08G 5/025 |
| 2016/0358480 | A1 | * | 12/2016 | Kang    | G01C 21/00 |

FOREIGN PATENT DOCUMENTS

EP          1336080          8/2003

OTHER PUBLICATIONS

Extended European Search Report for EP 19192420.8-1203, dated Feb. 25, 2020.

* cited by examiner

*Primary Examiner* — Gertrude Arthur Jeanglaude
(74) *Attorney, Agent, or Firm* — The Small Patent Law Group LLC; Joseph M. Butscher (57) ABSTRACT

An aircraft management system and method includes a flight plan diversion prediction system including a rerouting control unit that is configured to generate one or more reroute options for an aircraft based on an analysis of a current position of the aircraft, a predicted future position of the aircraft, a current position of an in-flight hazard, and a predicted future position of the in-flight hazard.

27 Claims, 5 Drawing Sheets

AIRCRAFT FLIGHT MANAGEMENT SYSTEMS AND METHODS

FIELD OF THE DISCLOSURE

Embodiments of the present disclosure generally relate to aircraft flight management systems and methods, and more particularly to systems and methods for predicting various aspects of flight plan diversion options for aircraft within an airspace.

BACKGROUND OF THE DISCLOSURE

Various types of aircraft are used to transport passengers and cargo between various locations. Each aircraft typically flies between different locations according to a defined flight plan or path. For example, a dispatcher may determine a particular flight plan for an aircraft between two different locations.

During a flight, a pilot may decide to divert from a current or original flight plan. For example, hazardous weather (such as a thunderstorm) that is ahead of an aircraft within the current flight plan may prompt a pilot to divert from the current flight plan to avoid the hazardous weather. As another example, air turbulence that is ahead of the aircraft within the original flight plan may also cause the pilot to divert from the current flight plan.

Typically, when a pilot diverts an aircraft from a current flight plan into a different heading, the pilot is not aware of an amount of fuel the aircraft will have at a landing destination until the aircraft links back into the original flight plan. As such, upon diverting from the original flight plan, the pilot may not be fully confident that the fuel onboard the aircraft at the landing destination will be within a predetermined safe range. That is, the pilot may be required to declare that the aircraft at the landing destination has a predetermined minimum remaining amount of fuel, but may not be sure that such declaration may be made due to the length of the diversion.

Further, rejoining the original route from a diversion may not provide an efficient path to the landing destination. For example, the diversion path may be sufficiently far away from the original flight plan that linking back up to the original flight plan may burn more fuel than another route into the landing destination.

SUMMARY OF THE DISCLOSURE

A need exists for a system and method of accurately predicting various flight path aspects of an aircraft that has diverted from an original flight plan. Further, a need exists for a system and method of allowing a pilot to assess how much fuel an aircraft will have at a destination before and/or after diverting from a flight plan. Moreover, a need exists for a system and method that provides flight path diversion options.

With those needs in mind, certain embodiments of the present disclosure provide an aircraft management system that includes a flight plan diversion prediction system including a rerouting control unit that is configured to generate one or more reroute options for an aircraft based on an analysis of a current position of the aircraft, a predicted future position of the aircraft, a current position of an in-flight hazard, and a predicted future position of the in-flight hazard.

In at least one embodiment, the flight plan diversion prediction system includes a monitor in communication with the rerouting control unit. The rerouting control unit is configured to show the reroute option(s) on the monitor. The rerouting control unit shows a reroute information indicator for the reroute option(s) on the monitor. The reroute information indicator includes one or more of predicted landing weight, predicted fuel on board (FOB), predicted fuel remaining, and predicted estimated time of arrival (ETA). The flight plan diversion prediction system may be onboard the aircraft.

The aircraft management system may include a tracking system that is configured to track the current position of the aircraft. A flight plan database may store a current flight plan of the aircraft. The flight plan database may also store the reroute option(s).

In at least one embodiment, an in-flight hazard tracking system is configured to track the current position of an in-flight hazard. The in-flight hazard tracking system may include a weather tracking sub-system that tracks weather. The in-flight hazard may include a weather cell. The in-flight hazard tracking system may include an air turbulence tracking sub-system that tracks air turbulence. The in-flight hazard may include the air turbulence. The in-flight hazard tracking system may include a restricted airspace tracking sub-system that tracks restricted airspace. The in-flight hazard may include the restricted airspace.

In at least one embodiment, the rerouting control unit is configured to determine a clearpoint for the reroute option(s). The clearpoint is a location at which the aircraft will be clear of the in-flight hazard. The rerouting control unit may be configured to determine the clearpoint by comparing the future position of the aircraft and the future position of the in-flight hazard.

The reroute option(s) may include one or more flight aspects for the aircraft at a destination location. The flight aspect(s) may include one or more of remaining fuel and weight of the aircraft.

In at least one embodiment, the rerouting control unit is further configured to generate the reroute option(s) based on an analysis of flight plans (including actual flight paths) of previous aircraft.

Certain embodiments of the present disclosure provide an aircraft management method that includes determining a current position of an aircraft within an airspace, determining a current position of an in-flight hazard within the airspace, predicting (by a rerouting control unit of a flight plan diversion prediction system) a predicted future position of the aircraft, predicting (by the rerouting control unit) a predicted future position of the in-flight hazard, and generating one or more reroute options for the aircraft based on an analysis of the current position of the aircraft, the predicted future position of the aircraft, the current position of an in-flight hazard, and the predicted future position of the in-flight hazard.

The aircraft management method may also include showing the reroute option(s) on a monitor that is communication with the rerouting control unit. The showing may include showing a reroute information indicator for the reroute option(s) on the monitor.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition may include additional elements not having that condition.

Certain embodiments of the present disclosure provide flight plan diversion prediction systems and methods that predict various aircraft aspects (such as remaining fuel and aircraft weight) of an aircraft upon arrival at a destination after the aircraft is diverted from an original flight plan.

The flight plan diversion prediction systems and methods utilize real-time analytics to evaluate in-flight options for re-routing around in-flight hazards, such as hazardous weather, turbulence, restricted airspace, and/or the like. In at least one embodiment, the flight plan diversion prediction systems and methods provide multiple diversion path options, and visually display the different options along with associated decision-making information, to a pilot to allow the pilot to make an informed decision in relation to the options. The flight plan diversion prediction systems analyze various types of information, such as weight of an aircraft, fuel burn, and/or wind and time over a waypoint to determine in-flight reroutes to a destination.

As described herein, a flight plan diversion prediction system includes a rerouting control unit that is configured to generate one or more reroute options for an aircraft based on an analysis of a current position of the aircraft, a predicted future position of the aircraft, a current position of an in-flight hazard, and a predicted future position of an in-flight hazard. The reroute option may also be based on the destination for the aircraft.

Figure 1:
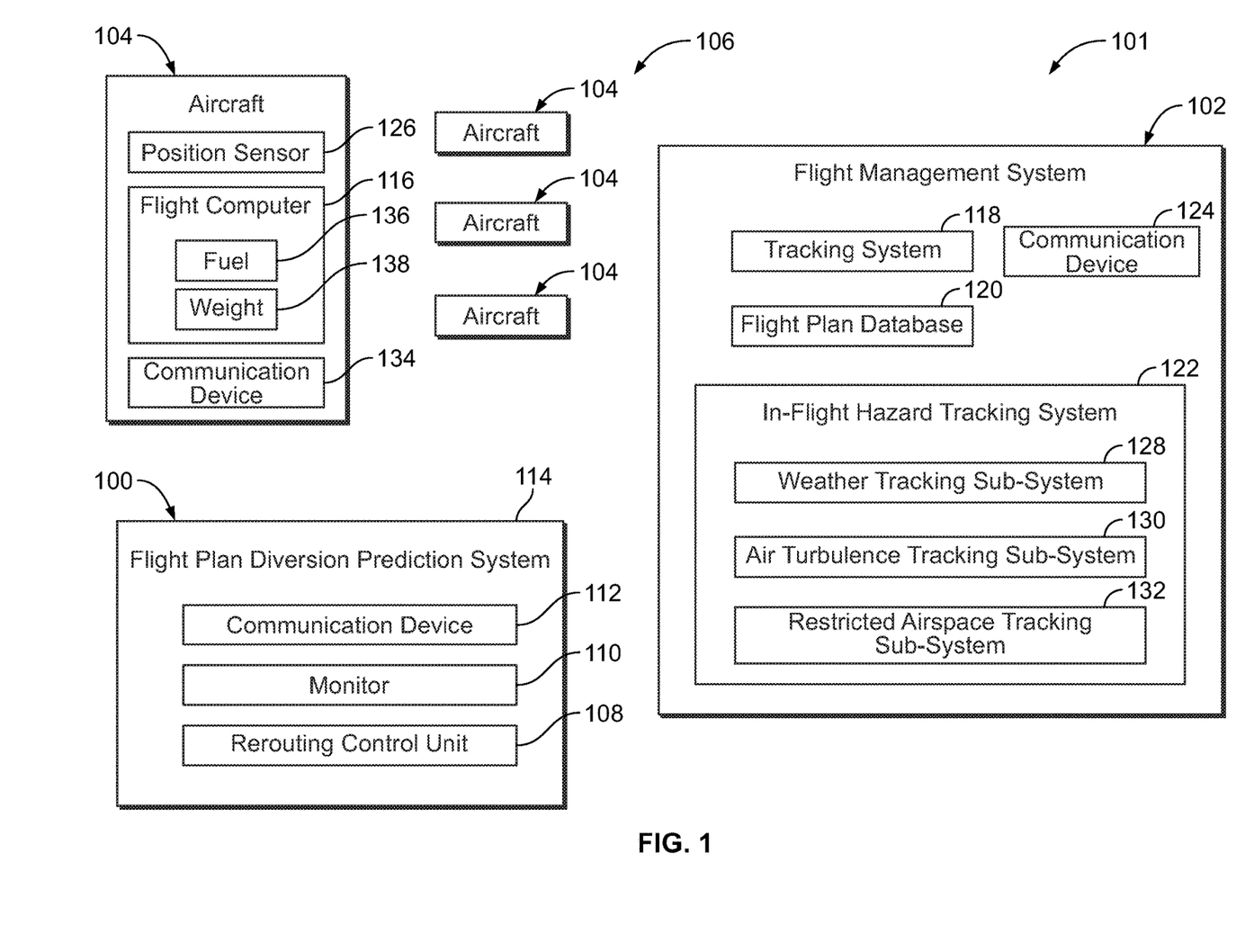
FIG. 1 is a schematic block diagram of a flight plan diversion prediction system in communication with a flight management system and one or more aircraft within an airspace, according to an embodiment of the present disclosure.

FIG. 1 is a schematic block diagram of a flight plan diversion prediction system 100 in communication with a flight management system 102 and one or more aircraft 104 within an airspace 106, according to an embodiment of the present disclosure. An aircraft management system 101 includes the flight plan diversion prediction system 100, the flight management system 102, and the aircraft 104. The flight plan diversion prediction system 100 includes a rerouting control unit 108 in communication with a monitor 110 and a communication device 112, such as through one or more wired or wireless connections. The monitor 110 may be a display screen, such as a touchscreen display, a computer display screen, a television, and/or the like. The communication device 112 may be or include one or more antennas, radio units, transceivers, receivers, transmitters, and/or the like. The communication device 112 allows the flight plan diversion prediction system 100 to communicate with the flight management system 102 and one or more of aircraft 104 within the airspace 106.

In at least one embodiment, the flight plan diversion prediction system 100 may be contained within a housing 114, such as a computer workstation, a handheld device (such as a smart phone or pad), and/or the like. As shown, the flight plan diversion prediction system 100 may be separate and distinct from the aircraft 104 and the flight management system 102. For example, the flight plan diversion prediction system 100 may be located at a monitoring station (such as at an air traffic control tower, flight operations center, and/or the like) that is remotely located from the aircraft 104.

In at least one other embodiment, the flight plan diversion prediction system 100 may be onboard an aircraft 104. For example, one or more of the aircraft 104 within the airspace 106 may include a flight plan diversion prediction system 100. As an example, a flight computer 116 of an aircraft 104 may include the flight plan diversion prediction system 100. As another example, the flight plan diversion prediction system 100 may be configured to be conveyed into and out of the aircraft 104. For example, the flight plan diversion prediction system 100 may be a separate and distinct computing device (such as a handheld device) of flight personnel, such as a pilot.

The flight management system 102 may be remotely located from the flight plan diversion prediction system 100, or may be collocated with the flight plan diversion prediction system 100. For example, both the flight management system 102 and the flight plan diversion prediction system 100 may be located at a flight operations center, an air traffic control tower, or the like. In at least one embodiment, the flight management system 102 may include the flight plan diversion prediction system 100. As noted, as another option, the flight plan diversion prediction system 100 may be onboard an aircraft 104 or at another location that is remote from the flight management system 102.

The flight management system 102 may include a tracking system 118, a flight plan database 120, an in-flight hazard tracking system 122, and a communication device 124, such as one or more antennas, radio units, transceivers, receivers, transmitters, and/or the like that allow for communication with the flight plan diversion prediction system 100 and the aircraft 104. The flight management system 102 may include the tracking system 118, the flight plan database 120, the in-flight hazard tracking system 122, and the communication device 124 at a common location, such as at an flight operations center or an air traffic control tower. In at least one other embodiment, at least one of the tracking system 118, the flight plan database 120, and the in-flight hazard tracking system 122 may be remotely located from one another.

The tracking system 118 is configured to track positions of the aircraft 104 within the airspace 106. For example, the aircraft 104 may include a position sensor 126 that outputs a position signal that is received and tracked by the tracking system 118. In at least one embodiment, the position signal is an automatic dependent surveillance-broadcast (ADS-B) signal and the tracking system 118 is an ADS-B tracking system. The position signal includes one or more position parameters, such as speed, altitude, heading, and the like. In at least one other embodiment, the aircraft 104 may be tracked through radar (for example, the tracking system 118 may be or include a radar system).

The flight plan database 120 stores flight plans (which may include future planned routes and/or current or previous actual flight paths flown) for the aircraft 104. For example, the flight plan database 120 may store the current flight plan for the aircraft 104. The flight plan database 120 may also store one or more reroute options (to a particular destination) for the aircraft 104, whether or not the reroute options are chosen by a pilot. The flight plans may include original flight plans for the aircraft 104 that include flight paths between departure locations and arrival or destination locations. In at least one other embodiment, each aircraft 104 may include a flight plan database 120, which may store an original flight plan for the aircraft 104 from a departure location to an arrival location. In at least one other embodiment, the flight plan database 120 may be separate and distinct from the flight management system 102.

The in-flight hazard tracking system 122 is configured to track in real time one or more types of in-flight hazards within the airspace 106. The in-flight hazard tracking system 122 includes one or more of a weather tracking sub-system 128, an air turbulence tracking sub-system 130, and a restricted airspace tracking sub-system 132. The in-flight hazard tracking system 122 may be part of the flight management system 102, as shown, or may be remotely located from and in communication with the flight management system 102, such as through one or more communication devices.

The weather tracking sub-system 128 may be any type of system that tracks current weather. For example, the weather tracking sub-system 128 may include a Doppler radar, a weather forecasting service, and/or the like. The weather tracking sub-system 128 is configured to monitor and track weather within the airspace 106 in real time, and may also provide weather predictions for the future.

The air turbulence tracking sub-system 130 is configured to track and/or predict locations of air turbulence within the airspace 106. The air turbulence tracking sub-system 130 may include a reporting service or system that determines locations of air turbulence within the airspace 106, such as through reports from pilots. Optionally, the in-flight hazard tracking system 122 may not include the air turbulence tracking sub-system 130.

The restricted airspace tracking sub-system 132 is configured to track and/or predict locations of restricted airspace within the airspace 106. The restricted airspace tracking sub-system 132 may include a reporting service or system that determines locations of restricted airspace within the airspace 106, such as through airport or governmental notices, reports, and/or the like. Optionally, the in-flight hazard tracking system 122 may not include the restricted airspace tracking sub-system 132.

In at least one embodiment, the weather tracking sub-system 128, the air turbulence tracking sub-system 130, and/or the restricted airspace tracking sub-system 132 are separate, distinct, and remote from the flight management system 102. The weather tracking sub-system 128, the air turbulence tracking sub-system 130, and/or the restricted airspace tracking sub-system 132 may be separately in communication with the flight plan diversion prediction system 100.

The aircraft 104 includes the flight computer 116 and the position sensor 126, as noted above. The aircraft 104 also includes a communication device 134, such as one or more antennas, radio units, transceivers, receivers, transmitters, and/or the like, that allow the aircraft 104 to communicate with the flight plan diversion prediction system 100 and the flight management system 102.

The flight computer 116 assesses a current amount of fuel 136 and weight 138 of the aircraft 104. The flight computer 116 determines the amount of fuel 136 burned by comparing the total amount of fuel 136 before takeoff to the current level of fuel 136. Further, the flight computer 116 determines a remaining amount of fuel 136 (that is, the current amount of fuel 136 onboard the aircraft 104). Similarly, the flight computer 116 determines the current weight 138 of the aircraft 104, and determines the difference between the current weight 138 and the weight 138 before takeoff.

During a flight, the aircraft 104 may divert from an original flight plan to a diverted flight plan based on an in-flight hazard as determined by the in-flight hazard tracking system 122. For example, the weather tracking sub-system 128 may detect hazardous weather within the airspace 106. The aircraft 104 may receive the weather report alert from the weather tracking sub-system 128, and the pilot may decide to divert around the weather. As another example, the aircraft 104 may divert from the original flight plan to a diverted plan due to air turbulence within the airspace 106, as determined by the air turbulence tracking sub-system 130, or a restricted airspace within the airspace 106, as determined by the restricted airspace tracking sub-system 132. Hazardous weather (as detected and/or determined by the weather tracking sub-system 128), air turbulence (as detected and/or determined by the air turbulence tracking sub-system 130), and a restricted airspace (as detected and/or determined by the restricted airspace tracking sub-system 132) are examples of in-flight hazards within the airspace 106 that a pilot may decide to divert around (that is, deviate from a current flight plan to a diverted flight plan to avoid such in-flight hazards).

In response to the aircraft 104 diverting from the original flight plan, the rerouting control unit 108 analyzes the current position of the aircraft 104. For example, the rerouting control unit 108 detects a current heading, position, and airspeed of the aircraft 104, such as determined by the tracking system 118. The rerouting control unit 108 may also analyze a current location of the in-flight hazard, such as hazardous weather as detected by the weather tracking sub-system 128. The rerouting control unit 108 analyzes the position of the aircraft 104 within the airspace 106, and the in-flight hazard, and determines one or more reroute options for the aircraft 104. The reroute options provide one or more diverted flight plan options that connect to a landing location, such as the arrival or destination location within the current or original flight plan.

The reroute options include a predicted amount of fuel and weight of the aircraft at the landing location. For example, the rerouting control unit 108 may communicate with the flight computer 116 to determine a current fuel 136 and weight 138 of the aircraft 104 and determine the predicted amount of fuel 136 and weight 138 at the landing location based on the determined reroute path and the current fuel consumption rate (that is, fuel burn) of the aircraft 104. The reroute option(s), including the predicted amount of fuel 136 and the predicted aircraft weight 138 at the landing location, are shown on the monitor 110.

As used herein, the term "control unit," "central processing unit," "unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the rerouting control unit 108 may be or include one or more processors that are configured to control operation thereof, as described herein.

The rerouting control unit 108 is configured to execute a set of instructions that are stored in one or more data storage units or elements (such as one or more memories), in order to process data. For example, the rerouting control unit 108 may include or be coupled to one or more memories. The data storage units may also store data or other information as desired or needed. The data storage units may be in the form of an information source or a physical memory element within a processing machine.

The set of instructions may include various commands that instruct the rerouting control unit 108 as a processing machine to perform specific operations such as the methods and processes of the various embodiments of the subject matter described herein. The set of instructions may be in the form of a software program. The software may be in various forms such as system software or application software. Further, the software may be in the form of a collection of separate programs, a program subset within a larger program or a portion of a program. The software may also include modular programming in the form of object-oriented programming. The processing of input data by the processing machine may be in response to user commands, or in response to results of previous processing, or in response to a request made by another processing machine.

The diagrams of embodiments herein may illustrate one or more control or processing units, such as the rerouting control unit 108. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the rerouting control unit 108 may represent processing circuitry such as one or more of a field programmable gate array (FPGA), application specific integrated circuit (ASIC), microprocessor(s), and/or the like. The circuits in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Figure 2:
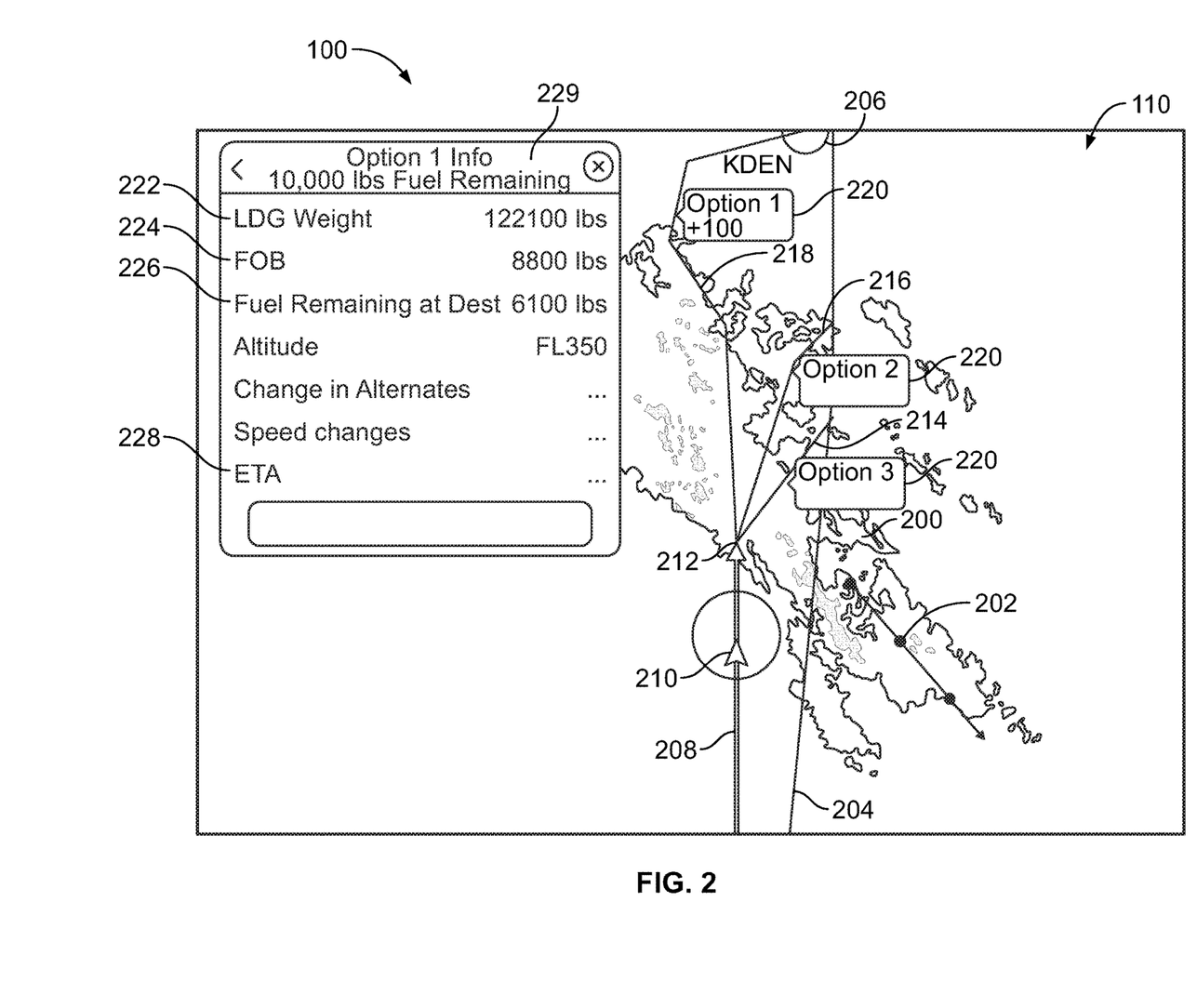
FIG. 2 is a diagrammatic representation of a front view of a monitor of a flight plan diversion prediction system, according to an embodiment of the present disclosure.

FIG. 2 is a diagrammatic representation of a front view of the monitor 110 of the flight plan diversion prediction system 100, according to an embodiment of the present disclosure. Referring to FIGS. 1 and 2, the weather tracking sub-system 128 detects a weather cell 200 having a vector 202 (including airspeed and direction). The flight plan diversion prediction system 100 receives data regarding the weather cell 200 from the weather tracking sub-system 128 and shows the weather cell 200 on the monitor 110. The monitor 110 also shows a portion of an original flight plan 204 (which the flight plan diversion prediction system 100 may receive from the flight plan database 120) to a destination location 206.

As shown, based on the weather cell 200, the aircraft 104 has diverted into a diverted flight plan 208. The current position of the aircraft 104 (as detected by the tracking system 118) is shown on the monitor 110 by a current position indicator 210.

A clearpoint 212 is also shown on the monitor 110. The clearpoint 212 is a location on the diverted flight plan 208 at which the aircraft 104 will be clear of the weather cell 200 (or other such in-flight hazard) based on the current course, airspeed and heading at a particular time. In at least one embodiment, a pilot may manually determine and locate the clearpoint 212 along the diverted flight plan 208. As another option, the clearpoint 212 may be determined as a predetermined position along the diverted flight plan, such as a point 10 miles away from the current position of the aircraft 104 as shown by the current position indicator 210 based on the current heading of the aircraft 104 and/or a predetermined future time, such as where the aircraft 104 will be in 5 minutes based on the current heading and airspeed of the aircraft 104.

In at least one other embodiment, the rerouting control unit 108 determines the location of the clearpoint 212. For example, the rerouting control unit 108 may analyze the weather cell 200 and the vector 202 to determine a location of the weather cell 200 at a particular time. The rerouting control unit 108 may compare the predicted location of the weather cell 200 and the vector 202 with the current position (as shown by the current position indicator 210) of the aircraft 104 to determine the clearpoint 212. For example, based on the diverted flight plan 208, the current position of the aircraft along the diverted flight plan 208, the movement of the weather cell 200, and the predicted motion of the weather cell 200 based on the vector 202, the rerouting control unit 108 determines the clearpoint 212. In particular, the rerouting control unit 108 assesses the current position, heading, and airspeed of the aircraft 104 on the diverted flight plan 208 (such as detected by the tracking system 118). The rerouting control unit 108 then compares the current position, heading, and airspeed (and optionally previous position, heading, and airspeed for a predetermined time) of the aircraft 104 with the location of the weather cell 200 and predicted location of the weather cell 200 at a future, later time based on the motion of the weather cell 200 as determined via the vector 202, and determines the location at which the aircraft 104 will be clear of the weather cell 200 at a future, later time (that is, the clearpoint 212).

As described, the clearpoint 212 may be determined and manually picked by a pilot of the aircraft 104, arbitrarily determined by the rerouting control unit 108, and/or dynamically and automatically determined by the rerouting control unit 108, such as based on the current location, heading, and airspeed of the aircraft 104 in relation to the current location and vector 202 of the weather cell 200 (the analysis of which allows the rerouting control unit 108 to predict the future positions of the aircraft 104 and the weather cell 200). After the clearpoint 212 is determined, the rerouting control unit 108 determines one or more reroute options 214, 216, and 218 for the aircraft 104. The reroute options 214, 216, and 218 may link or join back to the original flight plan 204. Optionally, at least one of the reroute options 214, 216, or 218 may not link or join back to the original flight plan 204. For each reroute option, 214, 216, and 218, the rerouting control unit 108 predicts or otherwise determines one or more flight path aspects (such as predicting remaining fuel, weight, or the like) for the aircraft 104 at the destination location 206 (if the aircraft 104 were to fly according to the particular reroute option 214, 216, and 218). The rerouting control unit 108 determines and predicts the flight path aspect(s) based on the current flight path aspect(s) of the aircraft 104 at the current location (such as remaining fuel, current airspeed, and current consumption level of fuel) and the length of the reroute options 214, 216, and 218.

For each reroute option 214, 216, and 218, the rerouting control unit 108 provides reroute information indicator 220, such as a box or area 229 (which may be expandable, such as through a swipe, slide, tap or the like of a finger, stylus, or the like). An individual may expand the reroute information indicator 220, such as by tapping with a finger (when the monitor is a touchscreen interface, for example), pointing and clicking with an engagement device (such as a stylus or mouse), and/or the like. Each reroute information indicator 220 that may list one or more predicted flight path aspects, such as a predicted landing weight 222, predicted fuel on board (FOB) 224, predicted fuel remaining 226 at the destination, and/or a predicted estimated time of arrival (ETA) 228 at the destination location 206 if the pilot chooses to fly according to a particular reroute option 214, 216, and 218. The reroute information indicator 220 may also include the FOB as of the current time. The pilot may then compare the predicted flight path aspects for each of the reroute options 214, 216, and 218 to make an informed decision as to an efficient and/or safe reroute option 214, 216, or 218 to choose.

As shown in FIG. 2, the rerouting control unit 108 determines and shows three reroute options on the monitor 110. Optionally, the rerouting control unit 108 may determine and show more or less than three reroute options. For example, the rerouting control unit 108 may determine 4 or more reroute options to the destination location 206 from the clearpoint 212.

The rerouting control unit 108 indicates the clearpoint 212 on the monitor 110 and provides one or more reroute options 214, 216, and/or 218, each of which includes reroute information indicator 220 listing one or more flight path aspects, thereby allowing a pilot of the aircraft 104 to know a predicted amount of fuel and weight at the destination location 206. Further, the rerouting control unit 108 provides a point in future time and space (that is, the clearpoint 212) from which a new route (such as the reroute options 214, 216, and 218) are determined. Accordingly, the flight plan diversion prediction system 100 provides a pilot with the ability to perform an informed and tactical flight plan diversion and reroute from the original flight plan 204. The flight plan diversion prediction system 100 allows the pilot to determine a tactical reroute without losing insight into how much fuel will be onboard the aircraft 104 upon landing at the destination location 206.

The reroute options 214, 216, 218 may be received by the flight management system 102, and stored in the flight plan database 120. A reroute option 214, 216, or 218 that is chosen by a pilot may be stored in the flight plan database 120 as an active reroute option. A reroute option 214, 216, or 218 that is not chosen by a pilot may be stored in the flight plan database as an inactive reroute option, or, alternatively discarded.

The reroute options 214, 216, 218 include the clearpoint 212. The reroute options 214, 216, 218 may each start from the clearpoint 212. In at least one other embodiment, each reroute option 214, 216, and 218 may include a separate clearpoint. The reroute options 214, 216, and 218 may or may not begin from a respective clearpoint. For example, each reroute option 214, 216, and 218 may include a diversion point from the flight plan 204, which may or may not be a clearpoint.

Figure 3:
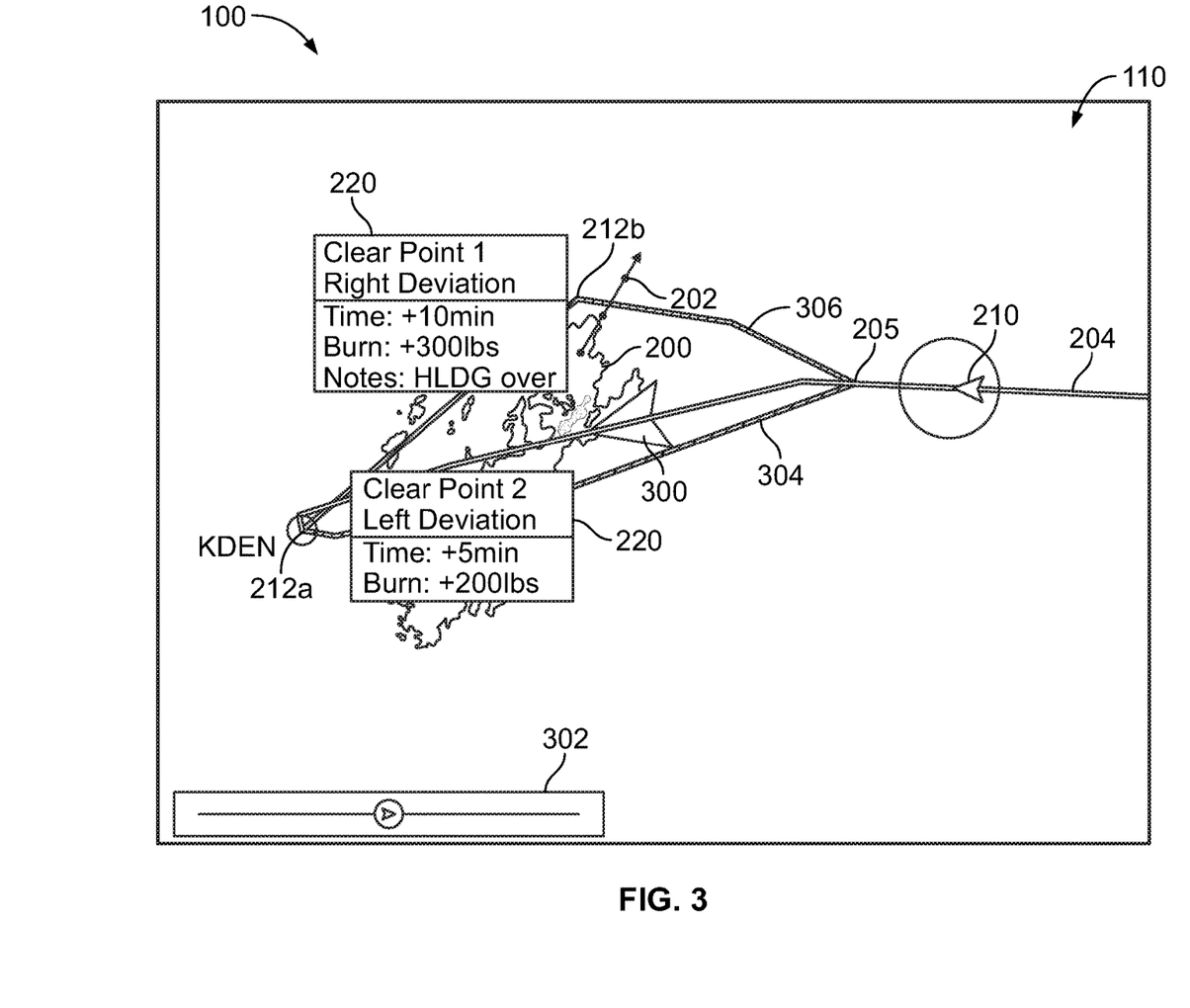
FIG. 3 is a diagrammatic representation of a front view of a monitor of a flight plan diversion prediction system, according to an embodiment of the present disclosure.

FIG. 3 is a diagrammatic representation of a front view of the monitor 110 of the flight plan diversion prediction system 100, according to an embodiment of the present disclosure. Referring to FIGS. 1 and 3, the current location of an aircraft 104 is shown by current position indicator 210. The current position indicator 210 is along an original flight plan 204. A future point along the original flight plan 204 is shown by a future position indicator 300. The future position indicator 300 is correlated with a predicted position at a future time along the original flight plan 204 if the aircraft 104 continues to fly according to the original flight plan 204. The rerouting control unit 108 shows the predicted position of the weather cell 200 and vector 202 (based on past motion and current position of the weather cell 200) on the monitor 110, and determines a predicted position of the aircraft 104 as indicated by the future position indicator 300 on the original flight plan 204. A time selector 302 (such as a slide bar on a touchscreen interface of the monitor 110) may be operated by an individual to illustrate relative positions of the weather cell 200 and the future position indicator 300. For example, a pilot may see the current position of the weather cell 200, and may move the time selector 302 to a position thirty minutes into the future, at which the rerouting control unit 108 shows the predicted position of the weather cell 200 along with the future position indicator 300 at the selected future time. If the rerouting control unit 108 determines and shows that the aircraft 104 will avoid the predicted position of the weather cell 200 at the selected future time, the pilot may opt to remain on the original fight plan 204.

If, however, the rerouting control unit 108 determines and shows that the aircraft 104 will be within the weather cell 200 at the selected future time, the pilot may choose a diverted flight path. For example, the pilot may choose from a first heading change that provides a first reroute option 304 (showing a first diverted flight path) starting from a diversion point 205 from the flight plan 204, and a second heading change that differs from the first heading change that provides a second reroute option 306 (showing a second diverted flight path) starting from the diversion point 205. Clearpoints 212a and 212b may be determined for each of the reroute options 304 and 306, respectively, as explained above. As shown, each of the first reroute option 304 and the second reroute option 306 includes a separate and distinct clearpoint 212a and 212b, respectively. For each of the reroute options 304 and 306, the rerouting control unit 108 may determine and show on the monitor 110 reroute information indicator 220 that may list one or more predicted flight path aspects. Based on the predicted flight path aspects, as shown in the reroute information indicator 220, the pilot may make an informed decision as to an efficient and/or safe reroute option 304 or 306 to pick. As shown in FIG. 3, the first reroute option 304 may add five minutes of flight time and burn two hundred extra pounds of fuel in relation to the original fight plan 204, while the second reroute option 306 may add ten minutes of flight time and burn three hundred extra pounds of fuel in relation to the original flight plan 204. As such, the pilot may opt for the first reroute option 304 (assuming the first reroute option 304 and the second reroute option 306 are substantially equally as safe), as it takes less total flight time and burns less fuel as compared to the second reroute option 306.

In at least one embodiment, the rerouting control unit 108 may monitor other aircraft 104 that are closer (and/or already landed) to the destination location in addition to monitoring the aircraft 104 indicated at the current position indicator 210. The rerouting control unit 108 may determine the rerouted flight paths chosen by the previous aircraft 104. For example, pilots of one or more previous aircraft 104 may have chosen a rerouted flight path to the North of the weather cell 200, while other aircraft 104 later in time may have chosen a rerouted flight path to the South of the weather cell 200. The rerouting control unit 108 may analyze the previously rerouted flight paths to determine the reroute options 304 and 306, including the diverted flight paths. The rerouting control unit 108 may determine the reroute options 304 and 306 based on weighted averages (such as of actual fuel and weight at the destination location, fuel burn, and/or the like) of the previous rerouted flight paths, for example.

The rerouting control unit 108 of the flight plan diversion prediction system 100 shows tactically on the monitor 110 an efficient (or relatively efficient as compared to others) and/or safe (or relatively safe as compared to others) diverted flight path via a comparison of the reroute options 304 and 306. The rerouting control unit 108 may analyze the flight path data of previous aircraft in front of the aircraft 104 denoted by the current position indicator 210 either in real time or via historical data to predict a time and fuel burn of the aircraft 104 for the reroute options 304 and 306. By having access to real time tracking data (such as through the tracking system 118), the rerouting control unit 108 is able to determine additional time and fuel approximations, and also if additional delays are present such as due to in-flight holding (for example, holding patterns).

Figure 4:
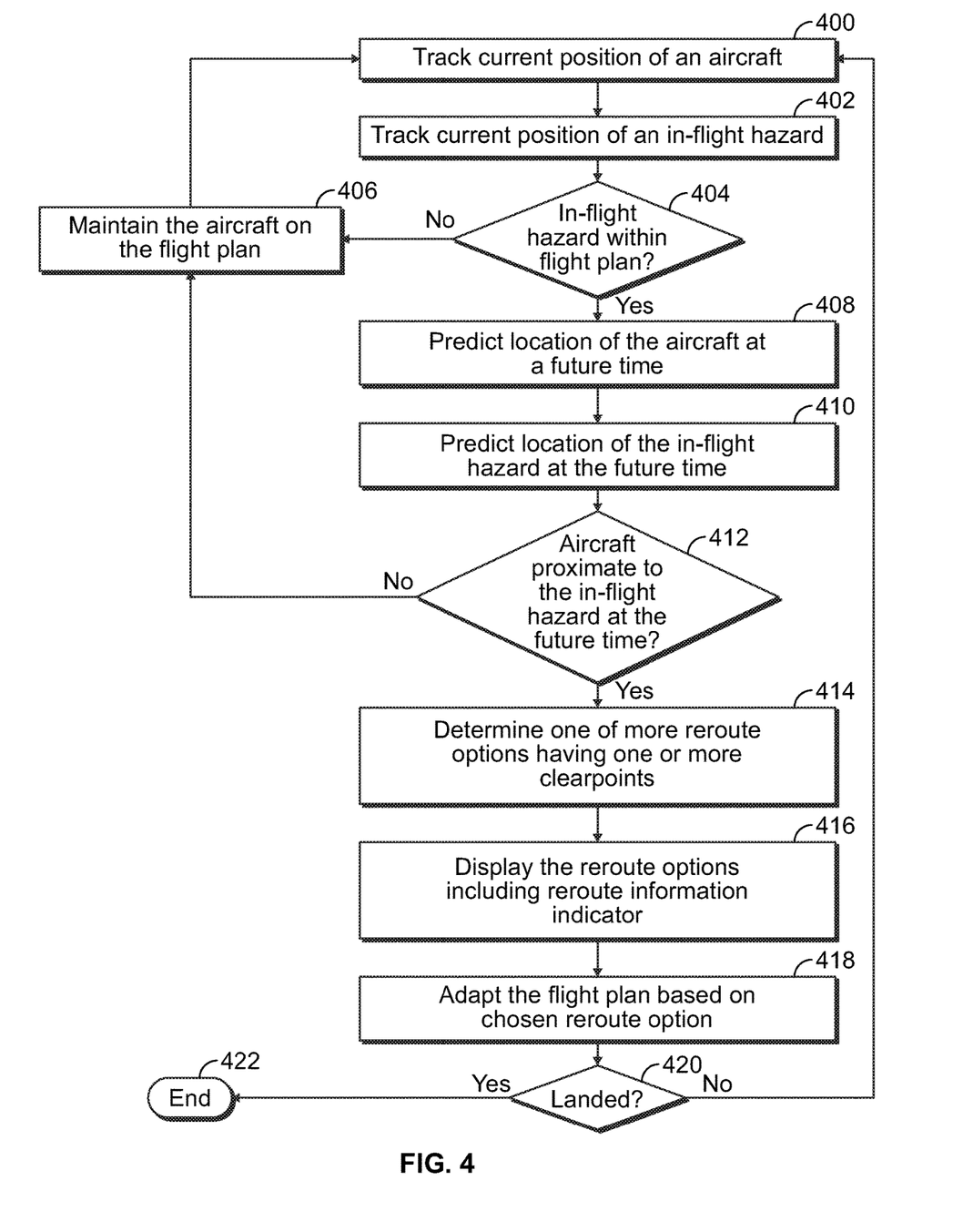
FIG. 4 illustrates a flow chart of an aircraft management method, according to an embodiment of the present disclosure.

FIG. 4 illustrates a flow chart of an aircraft management method, according to an embodiment of the present disclosure. Referring to FIGS. 1-4, at 400, a current position of an aircraft 104 is tracked, such as via the tracking system 118. At 402, a current position of an in-flight hazard (such as a weather cell, location of air turbulence, or restricted airspace) is tracked, such as via the in-flight hazard tracking system 122.

At 404, the rerouting control unit 108 determines whether the in-flight hazard is (and/or will be) within a current flight plan of the aircraft 104. Optionally, an individual, such as a pilot, may determine whether the in-flight hazard is within the current flight plan. If not, the method proceeds from 404 to 406, at which the aircraft is maintained on the current flight plan, and then the method returns to 400.

If, however, the in-flight hazard is (and/or will be) within the current flight plan, the method proceeds from 404 to 408, at which the rerouting control unit 108 predicts the location of the aircraft 104 at a future time (that is, a time later than the current time). For example, the rerouting control unit 108 may predict the location of the aircraft 104 at the future time by analyzing the past and current position, heading, direction, airspeed and/or the like of the aircraft, and making the prediction of the location of the aircraft based thereon.

At 410, the rerouting control unit 108 predicts a location of the in-flight hazard at the future time. For example, the rerouting control unit 108 may predict the location of the in-flight hazard at the future time by analyzing the past and current position and vector of the in-flight hazard, and making the prediction of the location of the in-flight hazard based thereon.

At 412, the rerouting control unit 108 determines whether the aircraft 104 will be proximate to (for example, at and/or within a predetermined range) the in-flight hazard at the future time, based on the predicted location of the aircraft 104 and the predicted location of the in-flight hazard at the future time. If the aircraft 104 will not be proximate to the in-flight hazard at the future time, the method proceeds from 412 to 406, and then back to 400.

If, however, the aircraft 104 will be proximate to the in-flight hazard a the future time, the method proceeds from 412 to 414, at which the rerouting control unit 108 determines one or more reroute options having one or more clearpoints. At 416, the rerouting control unit 108 displays the reroute options including reroute information indicator on the monitor 110.

At 418, the flight plan is adapted (for example, changed) based on a reroute option that is chosen by a pilot. At 420, the rerouting control unit 108 determines if the aircraft 104 has landed at a location. If so, the method ends at 422. If the aircraft 104 has not yet landed, the method returns to 400.

The flight plan diversion prediction system 100 includes the rerouting control unit 108 that generates one or more reroute options for an aircraft 104 based on an analysis of a current position of the aircraft 104, a predicted future position (that is, a position at a future time) of the aircraft 104, a current position of an in-flight hazard, and a predicted future position (that is, a position at the future time) of an in-flight hazard.

Figure 5:
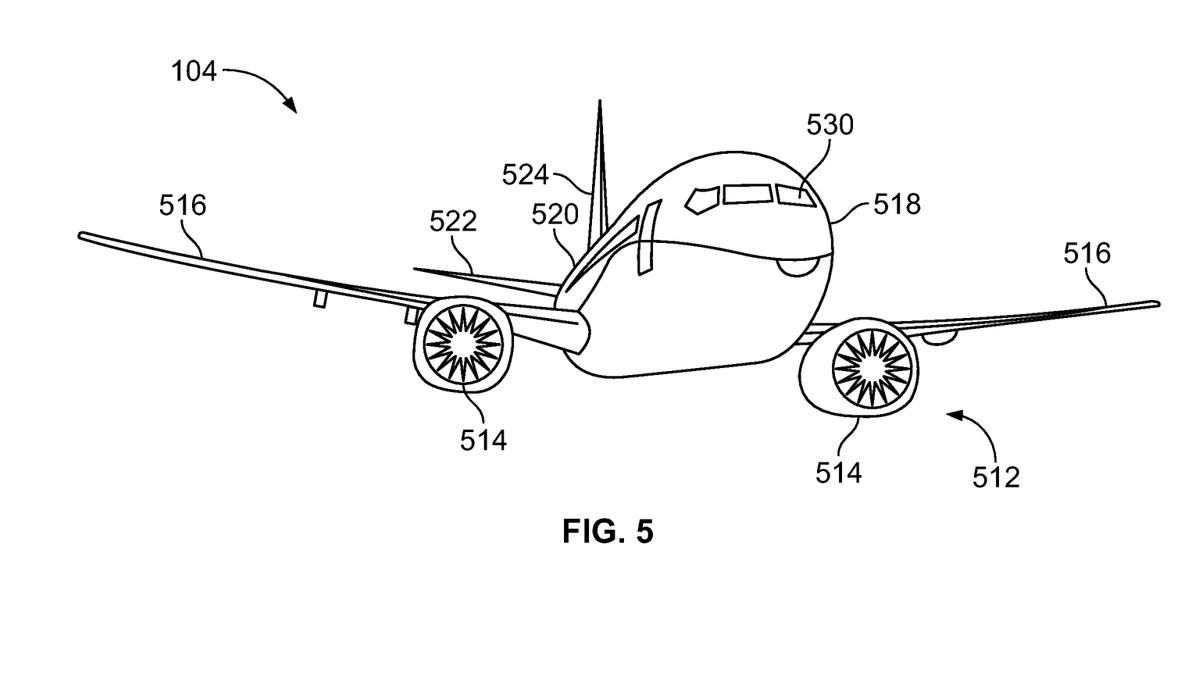
FIG. 5 is a diagrammatic representation of a front perspective view of an aircraft, according to an exemplary embodiment of the present disclosure.

FIG. 5 is a diagrammatic representation of a front perspective view of an aircraft 104, according to an exemplary embodiment of the present disclosure. The aircraft 104 includes a propulsion system 512 that may include two turbofan engines 514, for example. Optionally, the propulsion system 512 may include more engines 514 than shown. The engines 514 are carried by wings 516 of the aircraft 104. In other embodiments, the engines 514 may be carried by a fuselage 518 and/or an empennage 520. The empennage 520 may also support horizontal stabilizers 522 and a vertical stabilizer 524. The fuselage 518 of the aircraft 104 defines an internal cabin, which may include a cockpit 530 that includes the flight computer 116 (shown in FIG. 1), for example. Further, the flight plan diversion prediction system 100 (shown in FIG. 1) may be within the cockpit 530.

The aircraft 104 may be sized, shaped, and configured other than shown in FIG. 5. For example, the aircraft 104 may be a non-fixed wing aircraft, such as a helicopter. As another example, the aircraft 104 may be an unmanned aerial vehicle (UAV).

Referring to FIGS. 1-5, embodiments of the present disclosure provide systems and methods that allow large amounts of data to be quickly and efficiently analyzed by a computing device. For example, numerous aircraft 104 may be scheduled to fly within the airspace 106. As such, large amounts of data are being tracked and analyzed. The vast amounts of data are efficiently organized and/or analyzed by the rerouting control unit 108, as described herein. The rerouting control unit 108 analyzes the data in a relatively short time in order to quickly and efficiently output and/or display reroute information for the aircraft 104. For example, the rerouting control unit 108 analyzes current locations of the aircraft 104 and in-flight hazards in real or near real time to determine reroute options for one or more of the aircraft 104 based on predicted positions of the aircraft 104 and the in-flight hazards at future times. A human being would be incapable of efficiently analyzing such vast amounts of data in such a short time. As such, embodiments of the present disclosure provide increased and efficient functionality with respect to prior computing systems, and vastly superior performance in relation to a human being analyzing the vast amounts of data. In short, embodiments of the present disclosure provide systems and methods that analyze thousands, if not millions, of calculations and computations that a human being is incapable of efficiently, effectively and accurately managing.

As described herein, embodiments of the present disclosure provide systems and methods for accurately predicting various flight path aspects of an aircraft that has diverted from an original flight plan. Further, the systems and methods allow pilots to predict how much fuel an aircraft might have at a destination before and after diverting from a flight plan. Moreover, the systems and methods provide and display one or more flight path diversion options.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

The invention claimed is:

1. An aircraft management system, comprising:
a flight plan diversion prediction system including a rerouting control unit that is configured to generate one or more reroute options for an aircraft based on an analysis of a current position of the aircraft, a predicted future position of the aircraft, a current position of an in-flight hazard, and a predicted future position of the in-flight hazard, wherein the one or more reroute options comprise one or more flight aspects including remaining fuel and weight for the aircraft at a destination location.

2. The aircraft management system of claim 1, wherein the flight plan diversion prediction system further comprises a monitor in communication with the rerouting control unit, wherein the rerouting control unit is configured to show the one or more reroute options on the monitor.

3. The aircraft management system of claim 2, wherein the rerouting control unit shows a reroute information indicator for each of the one or more reroute options on the monitor.

4. The aircraft management system of claim 3, wherein the reroute information indicator comprises predicted landing weight, predicted fuel on board (FOB), predicted fuel remaining upon arrival, and predicted estimated time of arrival (ETA).

5. The aircraft management system of claim 1, wherein the flight plan diversion prediction system is onboard the aircraft.

6. The aircraft management system of claim 1, further comprising a tracking system that is configured to track the current position of the aircraft.

7. The aircraft management system of claim 1, further comprising a flight plan database that stores a current flight plan of the aircraft.

8. The aircraft management system of claim 7, wherein the flight plan database also stores the one or more reroute options.

9. The aircraft management system of claim 1, further comprising an in-flight hazard tracking system that is configured to track the current position of the in-flight hazard.

10. The aircraft management system of claim 9, wherein the in-flight hazard tracking system comprises a weather tracking sub-system that tracks weather, and wherein the in-flight hazard includes a weather cell.

11. The aircraft management system of claim 9, wherein the in-flight hazard tracking system comprises an air turbulence tracking sub-system that tracks air turbulence, and wherein the in-flight hazard includes the air turbulence.

12. The aircraft management system of claim 9, wherein the in-flight hazard tracking system comprises a restricted airspace tracking sub-system that tracks restricted airspace, and wherein the in-flight hazard includes the restricted airspace.

13. The aircraft management system of claim 1, wherein the rerouting control unit is configured to determine a clearpoint for the one or more reroute options, and wherein the clearpoint is a location at which the aircraft will be clear of the in-flight hazard.

14. The aircraft management system of claim 13, wherein the rerouting control unit is configured to determine the clearpoint by comparing the predicted future position of the aircraft and the predicted future position of the in-flight hazard.

15. The aircraft management system of claim 1, wherein the rerouting control unit is further configured to generate the one or more reroute options based on an analysis of flight plans of previous aircraft.

16. An aircraft management method, comprising:
determining a current position of an aircraft within an airspace;
determining a current position of an in-flight hazard within the airspace;
predicting, by a rerouting control unit of a flight plan diversion prediction system, a predicted future position of the aircraft;
predicting, by the rerouting control unit, a predicted future position of the in-flight hazard; and
generating one or more reroute options for the aircraft based on an analysis of the current position of the aircraft, the predicted future position of the aircraft, the current position of an in-flight hazard, and the predicted future position of the in-flight hazard, wherein the one or more reroute options comprise one or more flight aspects including remaining fuel and weight for the aircraft at a destination location.

17. The aircraft management method of claim 16, further comprising showing the one or more reroute options on a monitor that is in communication with the rerouting control unit.

18. The aircraft management method of claim 17 wherein the showing comprises showing a reroute information indicator for each of the one or more reroute options on the monitor.

19. The aircraft management method of claim 18 wherein the reroute information indicator comprises predicted landing weight, predicted fuel on board (FOB), predicted fuel remaining upon arrival, and predicted estimated time of arrival (ETA).

20. The aircraft management method of claim 16, further comprising tracking, by a tracking system, the current position of the aircraft.

21. The aircraft management method of claim 16, further comprising storing a current flight plan of the aircraft within a flight plan database.

22. The aircraft management method of claim 21, further comprising storing the one or more reroute options within the flight plan database.

23. The aircraft management method of claim 16, wherein the determining the current position of the in-flight hazard within the airspace comprises tracking, by an in-flight hazard tracking system, the current position of the in-flight hazard.

24. The aircraft management method of claim 16, wherein the generating comprises determining a clearpoint for the one or more reroute options, wherein the clearpoint is a location at which the aircraft will be clear of the in-flight hazard.

25. The aircraft management method of claim 24, wherein the determining the clearpoint comprises comparing the predicted future position of the aircraft and the predicted future position of the in-flight hazard.

26. The aircraft management method of claim 16, wherein the generating comprises analyzing flight plans of previous aircraft.

27. The aircraft management method of claim 16, wherein the rerouting control unit determines and predicts the one or more flight path aspects based on one or more current flight path aspects of the aircraft at the current position and a length of the one or more reroute options.

* * * * *